United States Patent

[11] 3,536,091

[72] Inventor Charles D. Erickson
 Erie, Pennsylvania
[21] Appl. No. 783,203
[22] Filed Dec. 12, 1968
[45] Patented Oct. 27, 1970
[73] Assignee A.O. Smith Corporation
 Milwaukee, Wisconsin
 a corporation of New York

[54] FLUID SEPARATOR AND ELIMINATOR
 10 Claims, 6 Drawing Figs.
[52] U.S. Cl. .................................................. 137/202,
 137/451
[51] Int. Cl. .................................................. F16k 45/02,
 F16l 55/06
[50] Field of Search .......................................... 137/202,
 451; 251(CT Digest); 137/192

[56] References Cited
UNITED STATES PATENTS
2,180,173 11/1939 Share ........................... 137/202X Primary Examiner—Alan Cohan
Attorney—Andrus, Sceales, Starke and Sawall ABSTRACT: This disclosure relates to an air separator and eliminator including a self-aligning valve structure interconnected to a float mounted in an air separating chamber connected in a liquid dispensing line. The valve structure includes a pair of air outlets, one of which is connected to exhaust the art from the chamber and the other of which is connected to a shutoff valve if sudden accumulation appears in the separating chamber.

Patented Oct. 27, 1970

INVENTOR.
Charles D. Erickson
BY
Anderson, Scarlin, Slocks & Sawall
Attorneys

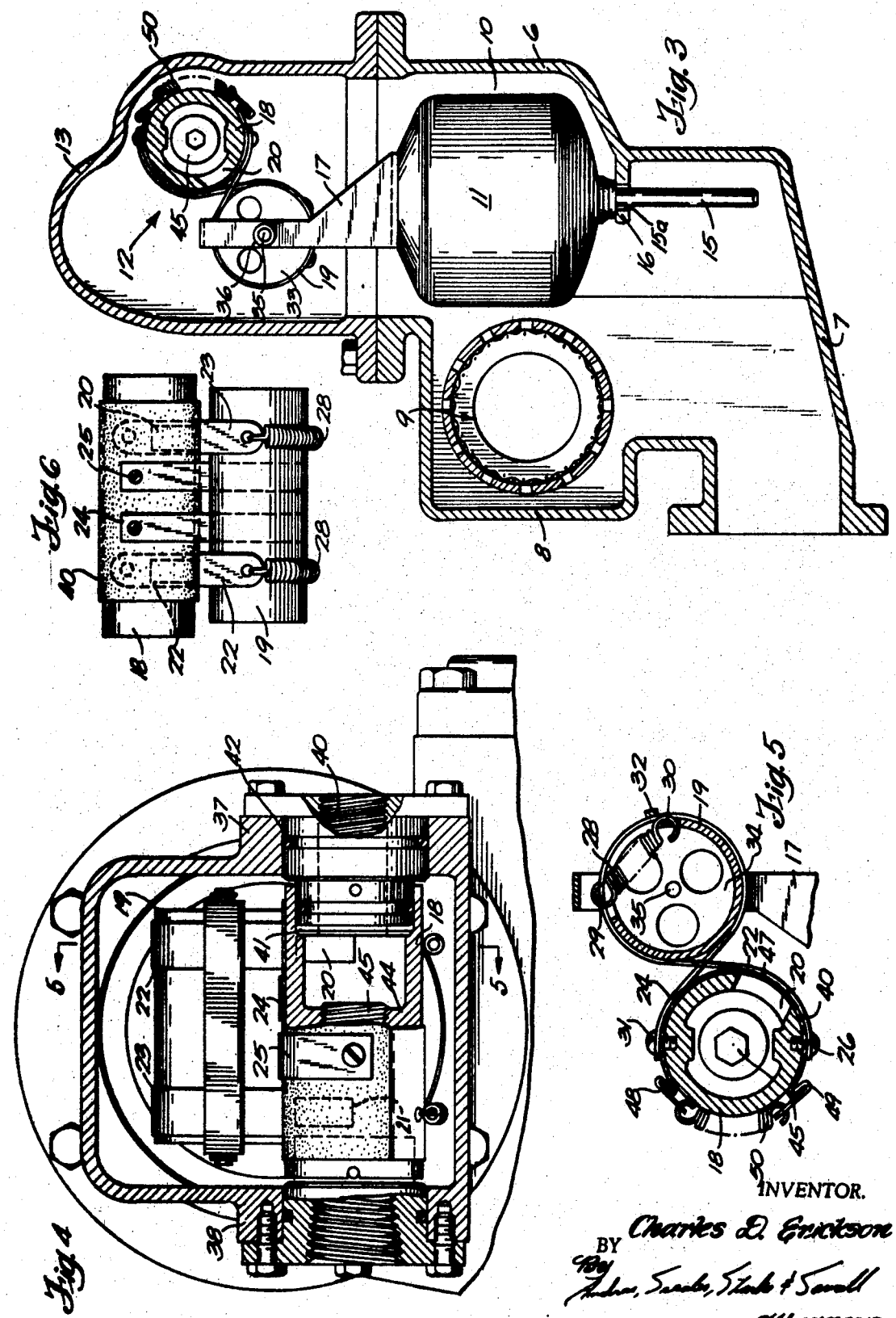

FLUID SEPARATOR AND ELIMINATOR

This invention relates to a fluid separator and eliminator apparatus and particularly to such apparatus having an improved float and valve release means.

In liquid petroleum dispensing systems, air eliminators may be employed to automatically eliminate air or other gas from the stream of flowing liquid. Thus, free air or other entrained gases which pass through the meter result in an erroneous reading of the actual volumetric flow of liquid. Under certain abnormal situations, the flow may desirably be terminated in response to a selected accumulation of a foreign substance or fluid in the flowing liquid.

Float activated valve systems have been suggested for incorporation into the flow line with a separating chamber within which the air or other similar fluid accumulates to actuate a float valve and provide the desired functioning. For example, U. S. Pat. No. 3,252,473 discloses a float operated air eliminating valve structure. A somewhat similar system is shown in U.S. Pat. No. 3,131,709 wherein a float valve actuates a flexible flat band which is connected to the float and caused to selectively open and close an aperature in a flat wall in response to the positioning of the float.

Although prior art float activated eliminators have been satisfactorily employed, they generally require special guide systems to establish predetermined float paths for proper operation of the valve. The secondary or auxiliary confinement results in the usual additional original and maintenance costs as well as reduced reliability and life.

The present invention is particularly directed to a highly novel and improved apparatus to separate gas or other fluid from the liquid, and if desired, to actuate the pilot control system for terminating or otherwise controlling the flow in response to a selected accumulation of the foreign fluid.

Generally, in accordance with the present invention, a self-tracking valve unit which is preferably constructed in accordance with applicant's copending application entitled "Positioning Apparatus And Valve" which was filed on October 8, 1968 and is assigned to the same assignee as this application, is connected to a float and forms the upper guide therefore. The lower end of the float is provided with a simple guide to generally hold the float in a vertical direction. The valve unit as disclosed in the copending application includes a pair of members defining curved surfaces arranged in physically opposed relationship. The valve members are interconnected by a pair of involuted opposed bands fixed at the opposite ends to the members, and in particular, being curved over the opposed curved surfaces of the valve members. Thus, the one band is connected to the first member and extends over the first curved surface and around the generally opposite curved surface of the opposite fixed member. The second band is oppositely disposed with respect to the two members and extends therebetween and over the opposite side of the curved surface of the one member and the opposite side of the surface of the second member. Thus, relative movement between the two members is a rolling action with the opposed bands inversely engaging the peripheral surface of the two members. The one member is fixed and moves the other, the rolling contact interengagement and release virtually eliminates friction and thus requires minimal operating force. By providing selective openings in the curved surfaces in alignment with the bands, the flow between the interior and exterior of the fixed member is controlled. The opposing bands establish counter forces which virtually eliminate the input force requirements.

In a highly satisfactory air eliminator, a chamber unit was connected in the flow line and included a float chamber. The one cylinder was mounted in the valve chamber as a fixed member with the opposite ends interconnected respectively to an air exhaust and to a flow control means. The fixed cylinder had a central dividing wall with a pair of apertures correspondingly axially spaced, one each to the opposite side of the wall. The valve bands were secured respectively to the fixed cylinder in alignment with and extended over the apertures and in an involuted or inverted manner about the generally opposite portion of the adjacent second cylinder which was mounted to move as a band control. A pair of opposing or balancing bands were secured inboard of the valve bands to the fixed cylinder and to the movable cylinder and extended about the fixed and movable cylinders in the direction opposite that of the valve bands. A bracket connected the movable cylinder to the upper end of a float in the float chamber. The lower end of the float was guided by a rod and opening guide arrangement to permit the float to move freely between the upper attachment to the free and self-tracking cylinder and the lower guide means.

The present invention thus provides a highly inproved flow assembly which provides a highly reliable sealing means with a rapid response to accumulation of air and the like. The guide means is extremely simple and reliable and thus may provide a relatively long life with minimum service requirements.

The drawings furnished herewith illustrate the best mode presently contemplated by the inventor for carrying out the present invention, and clearly disclose the above advantages and features as well as other which will be readily understood from the following description.

In the drawings:

FIG. 1 is a side elevational view of a separating device connected in a metering flow line for a petroleum product or the like;

FIG. 3 is a vertical section taken generally on line 3–3 of the separator shown in FIG. 2;

FIG. 4 is a fragmentary horizontal section taken generally on line 4–4 of FIG. 2.

FIG. 5 is a vertical section taken generally on line 5–5 of FIG. 4 with the valve in a closed position established by the raising of a valve assembly control float; and FIG. 6 is a plan view of the valve assembly shown in FIGS. 2—5.

Figure 1:
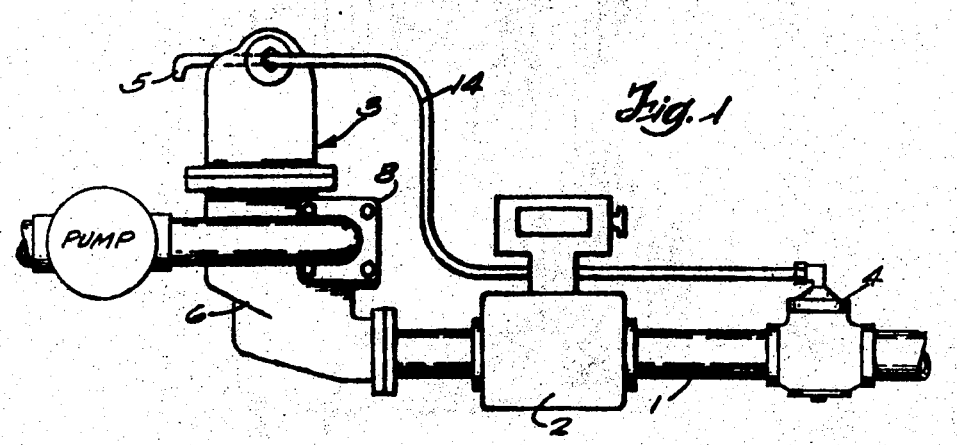
Figure 2:
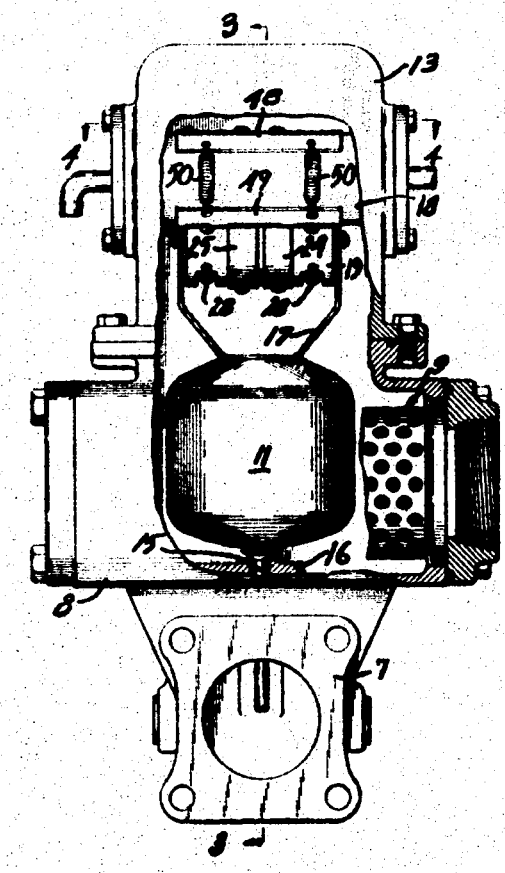
FIG. 2 is an enlarged side elevational view of the separator constructed in accordance with the present invention with parts broken away to show internal details of construction.

Referring to the drawing and particularly to FIGS. 1 and 2, the present invention is shown as a liquid flow system including a flow line 1 incorporating a meter 2 to record the volumetric flow of liquid, such as fuel oil, through the line. An air gas eliminator 3 is interconnected upstream of the meter, and is adapted to remove free air or other entrained gases which may be present in the flowing liquid before its entry into the meter. In the illustrated embodiment of the invention, the gas separator or air eliminator 3 is interconnected to actuate a pilot valve 4 and control the flow through line 1 and to a suitable air vent 5 to remove the entrained air or other gases.

As most clearly shown in FIGS. 2 and 3, the gas separator generally includes an outer flow casing or housing 6 having a lower outlet portion 7 and a laterally extending inlet portion 8 immediately above the outlet portion 7. A tubular filter screen 9 is secured in the laterally extending inlet portion. The screen is a strainer and diffuser which serves to remove foreign material from the liquid and to further diffuse the liquid stream in accordance with known practice. A float chamber 10 is disposed immediately adjacent the inlet chamber and thus in communication with the inlet and outlet chamber. A float 11 is disposed within the float chamber 10 and interconnected to a valve assembly 12 located immediately above the float 11. A valve head 13 is secured to the housing 6 immediately above the float chamber 10 and defines an extension of chamber 10 to enclose the valve assembly 12. The head 13 includes oppositely disposed outlets connected respectively to the pilot valve 4 via a conduit 14 and the air vent 5.

The liquid in the float chamber 10 will normally support the float 11 in a raised position corresponding to a closure of the valve assembly 12, as more fully developed hereinafter. Air or other gas which may be entrained within the liquid is released with the casing 6 and accumulates within the upper end of the float chamber 10 and causes the float 11 to drop or lower in the float chamber, to the position of FIGS. 2—4. This results in an opening of the valve assembly 12 and exhausts air to the air vent 5 and to the pilot valve 4. If there is an unusual or sudden accumulation of air or other gas, the exhaust through vent 5 will not be sufficiently rapid to normally prevent the flow from the gas separator through the flow line 1. This, however, will result in a rapid and full opening of assembly 12 with an application of sufficient pressure change to the pilot valve 4 to terminate the flow until the air has been completely exhausted.

More particularly in the illustrated embodiment of the invention, float 11 is a sealed bulb-type member disposed within the float chamber 10. A guide rod 15 is secured to the underside of the float 11 and extends downwardly through an opening 15a in guide wall 16 which is formed in the lower portion of the float chamber. The opening 15a is slightly larger than rod 15 to allow essentially free and unrestricted vertical movement of the float 11.

A generally rectangular valve attachment bracket 17 is secured to the upper end of the float 11 with the side arms of the bracket 17 extending upwardly into the valve assembly head 13 and connected to position the valve assembly 12.

The valve assembly 12 is shown in FIGS. 1—6 in a preferred construction in accordance with the previously identified copending application of this applicant for a gas separator for a petroleum flow line or the like. Generally, the assembly includes a fixed valve cylinder 18 extending laterally of the head 13 and a spaced parallel control cylinder 19 interconnected by a plurality of bands to cylinder 18. Cylinder 19 is interconnected to the bracket 17 for positioning relative to float 11 in accordance with relative levels of the gas and liquid in chamber 10.

The fixed valve cylinder 18 is provided with a pair of axially spaced and similar circumferentially extending valve openings or apertures 20 and 21. Cylinder 19 is interconnected to the fixed valve cylinder 18 by a pair of valve bands 22 and 23 which are aligned with the apertures or valve openings 20 and 21 respectively. The valve bands 22 and 23 are adapted to progressively engage and disengage the fixed cylinder 18 to correspondingly open and close the aligned apertures or valves 20 and 21. A pair of bias or balancing bands 24 and 25 are secured in an inverse or opposite manner to the cylinders 18 and 19 to provide an automatic guided movement of the two cylinders with the valve bands in rolling engagement with respect to the adjacent curved surfaces of the cylinders.

More particularly, the sealing bands 22 and 23 and the balancing bands 24 and 25 are resilient, flexible strips which may be formed of a suitable spring metal, a rubber-like material having stiffening members or the like. The bands are preferably such that they will tend to assume a planar configuration in the absence of any restraint.

The bands 22 and 23 are similarly secured to the cylinders 18 and 19 in a generally inverted or involuted manner. Thus, referring particularly to band 22 and FIGS. 2 and 5, the one end of band 22 is fixed to the bottom side or surface of the fixed cylinder as by a set screw 26. The band 22 is aligned with the aperture 20 and extends over the curved surface including the aperture 20 and then outwardly over and around the surface of the float activated cylinder 19.

The cylinder 19 is provided with a circumferential opening 27 and a coil spring 28 having hook ends 29 and 30 hooked to the adjacent end of the band 22 and to the cylinder at the remote end of the opening 27 to resiliently tension the band 22 about the cylinder 18. The float activated cylinder 19 is of a slightly lesser width than the fixed cylinder 18 but extends outwardly beyond the axial position of the apertures 20 and 21, as most clearly shown in FIGS. 2 and 5, to permit attachment of the bands 22 and 23 to the outer portions thereof.

The band 23 is secured to cylinders 18 and 19 in the same manner as band 22. The balancing bands 24 and 25 are disposed in laterally spaced relationship between the valve bands 22 and 23. The balancing bands 24 and 25 are similarly secured to the cylinders in fixed relationship thereto. Thus, the band 24 has its one end secured or fixed to the upper end of the fixed cylinder 18 as by set screw 31 generally diametrically opposite from the attachment of the band 22 by a set screw 26. The band 24 extends over the top surface of the cylinder 18 in the direction of the valve openings 20 and 21 and then downwardly between the fixed and the float activated cylinders 18 and 19. The lower end of the band 24 curves over the adjacent underportion of the cylinder 19 and is secured to the cylinder by a set screw 32. Thus, the bands 24 and 25 similarly pass between the cylinders 18 and 19 in the direction opposite that of bands 22 and 23 and are fixed thereto.

The several flexible bands, therefore, intending to assume their normal unstressed position, determine the position of the cylinders 18 and 19 with respect to each other. The band tension holds the movable cylinder 19 adjacent to the fixed cylinder 18 and thereby defines a self-contained and self-tracking valve mechanism. The float 11 is and may be connected directly to the free cylinder 19 which forms the only required connection and guide for the movable portion of the valve and the upper end of the float. This invention thereby eliminates the requirement for auxiliary supports and guide structures such as frames, constrictors, retainers and the similar secondary confinement means which have previously generally been employed in float activated valve assemblies and the like.

The opposite ends of the movable cylinder 19 are closed by apertured end walls 33 and 34 having central bearing pins or shafts 35 which project outwardly and into the side arms of the encircling supporting bracket 17. The float activated cylinder 19 is secured to the bracket by suitable snap rings 36 which snap suitable recesses in the outer ends of the bearing pins or shafts.

As most clearly shown in FIG. 5, the fixed cylinder 18 is aligned with a pair of outlet hubs 37 and 38 to the opposite sides of the housing and interconnected thereto by similar outlet couplers 39 which are bolted or otherwise secured to the hubs and project inwardly into the cylinders. The coupler 39 is provided with an outlet aperture or opening 40 communicating directly with the adjacent portion of the cylinder 18 with a coupling portion 41 extending inwardly therefrom into a recessed portion of the adjacent end of the fixed cylinder 18. At first, O-ring seal 42 is disposed between the hub 37 and the adjacent portion of the outlet coupler 39. A second inner O-ring seal 43 is disposed between the inner projection or portion 41 of the coupler 39 and the interior surface of the cylinder 18. In this manner, the couplers 39 are interconnected to the opposite ends of the fixed cylinder 18 to provide intercommunication between the adjacent portion of the cylinder and the air vent 5 and the poppet valve 4, respectively.

The fixed cylinder 18 is provided with an integral central wall 44 having a central opening which is sealed by a pipe plug 45. The sealed central wall 44 defines a pair of separate signal chambers aligned respectively with the valve openings or apertures 22 and 21 to provide separate signals to the air vent 5 and valve 4.

The surface of the fixed cylinder 18 is provided with a sealing cover 46 in the form of a sheet-like member which is secured to the exterior surface of the cylinder. The sealing member or cover 46 may be a resilient rubber-like material which is provided with suitable slots 47 aligned with the apertures 20 and 21 of the cylinder 18. The sealing member 46 is of a width slightly less than the length of the cylinder 18 and the opposite longitudinal ends are clamped within generally U-shaped connecting places 48 and 49 respectively. The connecting plates 48 and 49 are disposed to the back of cylinder and open towards each other with the crimped ends of the sealing member bent backwardly into the U-shaped connecting plates. Suitable coil springs 50 interconnect the plates 48 and 49 at laterally spaced locations to resiliently clamp the sealing member 46 to the face of the cylinder 18. The sealing member 46 provides a highly effective sealing in the presence of foreign matter. The thickness of the sealing member 46 is preferably held to a minimum such that the valve seat is not excessively raised with a corresponding change in the curcature of the sealing bands.

The spring loaded tension of the bands 22 and 23 imparts an initial loading on the valve seats to assure a highly effective, liquid tight seal with zero pressure differential across the unit. Further, as the outer external pressure applied to the cylinder 18 increases, the sealing effectiveness increases.

In the operation of the illustrated gas separator, the liquid flow passes through the casing 6 between the inlet and outlet portions 8 and 7. The float 11 is normally in a raised or upper position with the valve activated cylinder 19 in a corresponding raised position, as shown in FIG. 5. In this position, the valve bands 22 and 23 are tightly clamped against the cylinders 18 and 19 and over the apertures 20 and 21 in the fixed cylinder to positively seal the valve openings. The float 11 in moving the cylinder 19 upwardly causes the sealing bands 22 and 23 to essentially freely roll over the sealing surface to affect the desired closure of the valve openings. The curved sealing bands permit them to resist a greater internal pressure for any given band thickness when compared with a relatively planar or flat type band seal. The reverse interconnection of the sealing bands 22 and 23 and the balancing bands 24 and 25 maintain the illustrated fixed relation and positively insure the rolling interengagement of the sealing bands with the fixed cylinder and the release of the balancing bands with respect to the fixed and movable cylinders.

If a charge of air or a liquid-air mixture enters into the gas separator housing 6, the air rapidly rises into the higher portion of the float chamber 10 and displaces the liquid around the float 11. As the liquid level drops, it approaches the bouyancy limit level of the float 11 and at a selected level determined by the construction of the float causes the float to move downwardly with the liquid level. This results in a lowering of the float activated cylinder 19 with a rotation of the cylinder 19 accompanied by progressive release of the sealing bands 22 and 23 from the fixed cylinder 18 and a corresponding intersurface engagement of the balancing bands 24 and 25 with the surface of the cylinder 18. Simultaneously, bands 22 and 23 engage cylinder 19 and disengage cylinder 18, to establish the condition shown in FIGS. 4 and 5. As a result, the valve openings or apertures 20 and 21 are opened and the accumulated air or other gas passes through the respective chambers of cylinder 13 to the air vent 5 and the pilot valve 4 to permit release of the accumulated air and to simultaneously provide a signal to the pilot valve 4. If there is sudden accumulation, the float 11 drops rapidly and the signal to pilot valve 14 terminates flow until a selected amount of the air escapes through vent 5.

As previously noted, the opposite or involuted bands interconnecting a pair of members having the curved surfaces establishes a self-contained and self-tracking valve assembly. Consequently, the operation of the gas separator does not depend on a preselected traveling of the float on a predescribed path. The float 11 is therefore allowed to travel freely between the upper attachment of the cylinder and the lower guide provided by the shaft guide 15.

Generally, the movable cylinder 19 will roll freely and essentially frictionless because the energy released by unbending of the one set of bands is equal to the energy required to bend the opposite set of bands. As a result, the combination float and free moving valve member establish a rapid response with a direct acting pressure signal applied to the control valve which may be of any suitable construction which provides the desired response to the pressure signal.

The valve may be readily biased with a constant force to operate in either direction by changing the relative spring dimensions or spring characteristics of the band members. Such bias may be desirable in order to decrease the float operating load and response time to allow the valve to open more freely against pressure and the like.

Generally, the band material is to be selected in accordance with the life and duty cycle requirements. The band material may be subjected to a corrosive action as the result of moisture condensation should have a normally long life in excessive of 10 years. An 18-chrome, 8-nickel alloy steel has been found to be suitable for a petroleum product system.

I claim:

1. In a fluid separator apparatus comprising:
   a housing defining a float chamber and a valve chamber extending therefrom;
   a valve assembly having a pair of valve members having cylindrical surfaces, a first band means having means to resiliently urge the band to a preselected configuration and passing between said members and bent over said cylindrical surfaces and connected at spaced portions to said members, a second band means having means to resiliently urge the second band means to a preselected configuration and passing between said members in the opposite direction from said first band means and bent over said cylindrical surfaces and connected at spaced portion to said valve members, said first and second band means constituting the sole supporting connection between said members and being selected to maintain the members in predetermined spaced relation with the band means in surface engagement with the cylindrical surfaces, a first of said valve members having a valve opening in the cylindrical surface aligned with the band means;
   means to fixedly mount said first valve member within said valve chamber with said second valve member being free to move about the first valve member in accordance with the inverse engagement and disengagement of said first and second band means; and
   a float member disposed within said float chamber, means to connect the upper end of the float member to said movable valve member, said second valve member constituting the guide means for said float member.

2. The fluid separator apparatus of claim 1 including a flow control means responsive to a fluid signal and wherein said first valve member includes a pair of valve openings aligned with said band means and having separate internal chambers aligned with each valve opening, means to connect one internal chamber to the atmosphere and the second internal chamber to said flow control means.

3. The fluid separator of claim 1 wherein the valve chamber extends upwardly from the float chamber and said float member includes a depending bottom guide member, and said housing includes a wall means having an opening through which said guide member freely moves.

4. The positioning apparatus of claim 1 wherein said members are cylinders;
   said first band means including a flat strip of resilient metal; and
   said second band means including a flat strip of resilient metal.

5. The fluid separator of claim 1 wherein the valve chamber extends upwardly from the float chamber and said float member and housing include a lower guide means for guiding the lower end of the float member.

6. The fluid separator of claim 1 wherein the valve chamber extends upwardly from the float chamber, said housing including a flow passageway extending laterally from one side of the float chamber and having an upper inlet means and a bottom outlet means, said float member constituting a sealed hollow ball member aligned with and disposed below said second valve member, and means connecting the top of said ball member to said valve member.

7. The fluid separator of claim 1 wherein the valve chamber extends upwardly from the float chamber, said housing including a flow passageway extending laterally from one side of the float chamber and having an upper inlet means and a bottom outlet means, said float member constituting a sealed hollow ball member aligned with and disposed below said second valve member, and said second valve member being a cylindrical member having a horizontal axis, and a bracket means connected to the ball member and to the opposite ends of the cylindrical member.

8. The fluid separator of claim 7 wherein said connection of the bracket means to the cylindrical member constitutes rotatable connections at the axis of said cylindrical member.

9. The fluid separator of claim 1 wherein the valve chamber extends upwardly from the float chamber, said first valve member being a cylinder extending between and sealed at the opposite ends to the walls of said valve chamber, said cylinder having an intermediate wall and having at least one valve opening to each side of said intermediate wall, connecting means in each of said side walls communicating with the adjacent end of the cylinder.

10. The fluid separator of claim 9 having a flow control means responsive to a fluid signal and connected to one of said connecting means, the other of said connecting means being connected to a vent means.